Oct. 13, 1931.  A. J. MUSSELMAN  1,827,668
PNEUMATIC TIRE
Filed Oct. 1, 1928
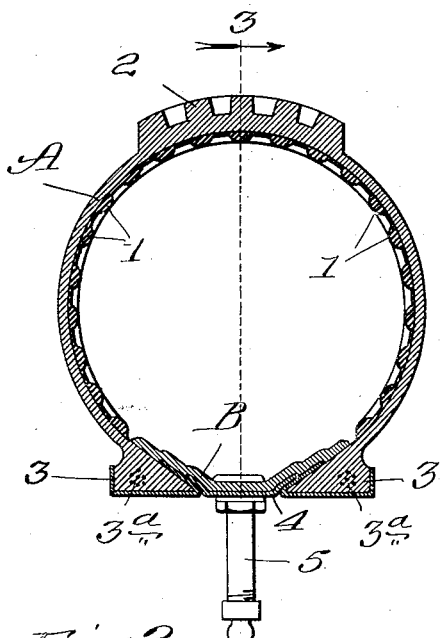
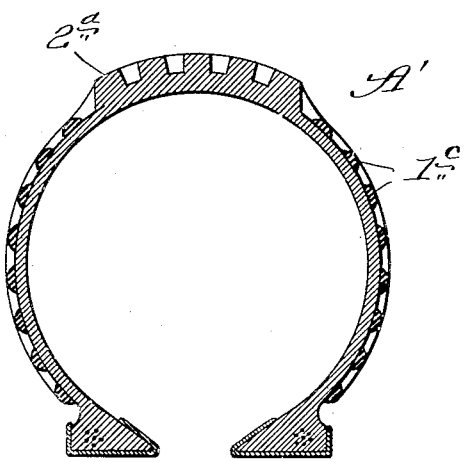
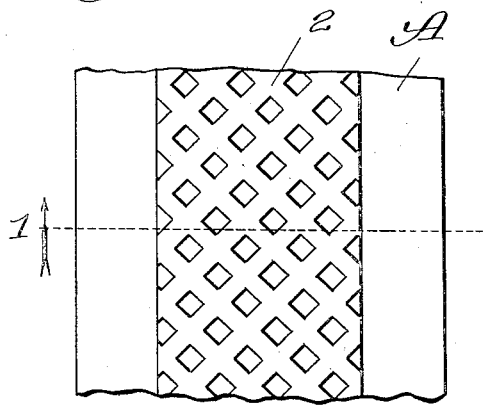
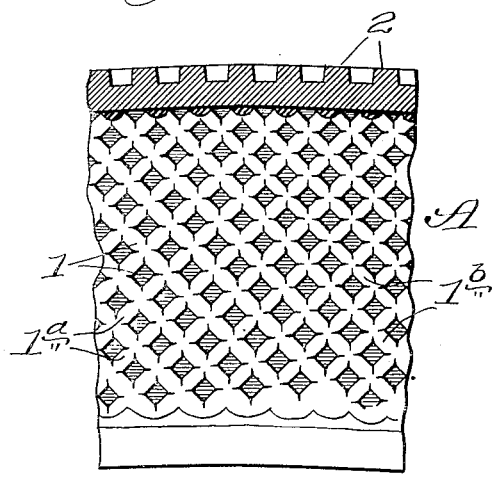
Inventor:
Alvin J. Musselman,
By Dyrenforth, Lee, Chritton & Wiles,
Attys.

Patented Oct. 13, 1931

1,827,668

UNITED STATES PATENT OFFICE

ALVIN J. MUSSELMAN, OF AKRON, OHIO, ASSIGNOR TO THE GOODYEAR TIRE & RUBBER COMPANY, OF AKRON, OHIO, A CORPORATION OF OHIO

PNEUMATIC TIRE

Application filed October 1, 1928. Serial No. 309,487.

This invention relates particularly to high-capacity pneumatic tires adapted to operate at comparatively low pressure per unit of area.

The primary object is to provide an improved tire of simple construction which can be readily manufactured at low cost.

The invention is illustrated in a preferred embodiment in the accompanying drawings, in which—

Fig. 1 is a cross-section of a tire embodying the invention, a section being taken as indicated at line 1 of Fig. 2; Fig. 2, a broken plan view of the tire; Fig. 3, a broken sectional view taken as indicated at line 3 of Fig. 1; and Fig. 4, a sectional view illustrating a modification.

In the construction illustrated in Figs. 1–3, A designates a casing which is provided internally with tension-ribs 1 and which is provided externally with a tread-portion 2 which may be of any desired form.

The casing A preferably is molded in desired form from a suitable rubber compound, or compounds, the tension-ribs being formed integrally with the body in the molding operation. As illustrated, the tension-ribs comprise two series, designated, respectively, 1ª and 1ᵇ. These series of ribs are disposed cross-wise with relation to each other and extend obliquely or spirally with relation to the contour of the casing. The purpose is to so dispose the tension-ribs as to enable them to withstand the stresses exerted upon the casing under conditions of use.

The tension-ribs preferably substantially cover the side-walls of the casing (internally or externally) and also preferably extend spirally or obliquely across the tread-portion of the tire. If desired, the tension-ribs may be composed of a compound which will give an especially high tensile strength, while the body of the casing may be of a more highly elastic rubber compound.

The casing is shown provided with attaching flanges 3 which may contain reinforcing wires, or the like, 3ª.

In the construction being described, B designates a sealing strip which covers the channel between the flanges 3 and is cemented, or vulcanized, to the base-portion of the casing. This strip may be provided with reinforcements, as indicated at 4. Also, the strip may be provided with an air-valve 5 by means of which the casing may be inflated.

In the construction just described, the reinforcing ribs are at the inner wall of the casing. In the construction shown in Fig. 4, A' designates the casing which is provided externally with tension-ribs 1ᶜ. In this construction, it may be assumed that there are two series of tension-ribs which are cross-wise related to each other and which extend spirally about the casing so that the ribs will be in the best position to resist stresses when the casing is in use. In this instance, the tension-ribs may extend across the tread-portion of the tire and an anti-skid tread-portion 2ª may be superposed over the ribs.

If desired, an inner tube may be used in connection with the construction illustrated in Fig. 4; or, if preferred, a sealing strip similar to the strip B shown in Fig. 1 may be applied, and the tire may then be used as a single tube tire.

The tension-ribs may vary in size and in number, as may be found most desirable in practice for any given situation.

In my application Serial No. 279,985, filed May 23, 1928, I have described a high-capacity balloon tire in which fabric is employed in the body of the casing. According to the present invention, the fabric is omitted from the body of the casing and tension-ribs formed from a suitable rubber compound preferably are employed as a substitute for the omitted reinforcing. While it is preferred to employ rubber tension-ribs, it is not my intention to unnecessarily limit the invention. In some situations where the internal pressure may be very low in the use of the tire, the tension-ribs may be reduced to rudimentary ribs, or possibly be wholly omitted in some instances.

It may be added that the omission of reinforcing canvas, cords, or the like, substantially reduces the cost of the tire for two reasons, namely: First, because of a reduction in the cost of materials; and, second, because of a reduction in the cost of labor involved in the construction. The tire may be suitably molded and vulcanized in accordance with known methods, and suitable known rubber compounds may be employed in forming the tire.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A pneumatic tire comprising a high capacity rubber casing, the sidewalls and a tread of the casing being composed of solid homogeneous elastic rubber of a type designed to resist wear, and inner diagonally disposed ribs extending substantially from bead to bead of the carcass, said ribs being composed of rubber compound which has high resistance to tensional force and constituting a substitute for the usual fabric reinforcing elements in pneumatic tires.

2. A pneumatic tire comprising a high capacity rubber casing, the sidewalls and a tread of the casing being composed of solid homogeneous elastic rubber of a type designed to resist wear, and diagonally disposed ribs extending substantially from bead to bead of the carcass, said ribs being composed of rubber compound which has high resistance to tensional force and constituting a substitute for the usual fabric re-enforcing elements in pneumatic tires.

ALVIN J. MUSSELMAN.